United States Patent [19]

Gach

[11] Patent Number: 4,516,357
[45] Date of Patent: May 14, 1985

[54] COOLANT SUPPLY APPARATUS FOR A GRINDING TOOL

[76] Inventor: Paul Gach, 1224 Woodbridge, St. Clair Shores, Mich. 48080

[21] Appl. No.: 466,437

[22] Filed: Feb. 15, 1983

[51] Int. Cl.³ .............................................. B24B 9/10
[52] U.S. Cl. ..................... 51/98 R; 51/102; 51/267; 51/272
[58] Field of Search ................... 51/72 R, 98 R, 102, 51/266, 267, 272, 322; 409/135, 136, 137; 416/60, 91, 146 R

[56] References Cited

U.S. PATENT DOCUMENTS

| | | | |
|---|---|---|---|
| 614,138 | 11/1898 | Sims | 416/91 |
| 1,827,688 | 10/1931 | Ley | 51/267 |
| 2,110,441 | 3/1938 | Kasch | 51/267 |
| 2,343,556 | 3/1944 | Jacobsen | 51/98 R |
| 2,377,271 | 5/1945 | Schumann | 51/266 X |
| 2,457,283 | 12/1948 | Slater | 51/267 X |
| 2,489,437 | 11/1949 | Sandoz | 51/267 |
| 2,735,236 | 2/1956 | Townshend | 51/102 |
| 2,826,019 | 3/1958 | Garrison | 51/267 |
| 3,032,940 | 5/1962 | Sutton | 51/267 |
| 4,423,568 | 1/1984 | Gould | 51/267 X |
| 4,439,952 | 4/1984 | Roberts et al. | 51/266 X |

FOREIGN PATENT DOCUMENTS 1039994  10/1953  France ........................ 51/100 R

*Primary Examiner*—Robert P. Olszewski
*Attorney, Agent, or Firm*—Patrick J. Barrett

[57] ABSTRACT

A coolant supply apparatus for use with a grinding apparatus having a vertical rotating grinding tool is disclosed. Coolant is contained in a reservoir underneath a work table on which the work piece to be ground is supported. The lower portion of the grinding tool sits in the coolant in the reservoir and an impeller is attached to the lower portion of the grinding tool. An annular collar depending from the bottom of the work table surrounds the impeller and a portion of the grinding tool. As the impeller rotates it throws coolant up into the collar and a bevelled edge at the upper portion of the collar directs the coolant onto the surface of the grinding tool.

21 Claims, 12 Drawing Figures

1

COOLANT SUPPLY APPARATUS FOR A GRINDING TOOL

BACKGROUND OF THE INVENTION

Grinding machines having an essentially cylindrical grinding tool mounted on a vertical shaft protruding through a horizontal work table are commonly used for shaping pieces of glass used in making stained glass windows and the like. The piece of glass is supported on the surface of the work table and held against the rotating grinding tool by an artisan's hand to remove material from the edges of the piece of glass. Heat is generated in the grinding process, and it is therefore necessary to supply coolant to the grinding tool to keep it from over heating, as well as to wash away ground particles of glass.

Prior art grinders of this type supply coolant to the grinding tool by a sponge that is held against the surface of the grinding tool and rests in a reservoir of coolant beneath the work table. This method of supplying coolant to the grinding tool is economical, but it has several disadvantages. The sponges wear out from constant contact with the rotating grinding tool, and they can be knocked out of place. In addition, they do not always supply a sufficient quantity of coolant to the surface of the grinding tool. Furthermore, the surface of the sponge becomes clogged with glass particles and needs to be cleaned periodically.

Some prior art industrial grinding machines use various kinds of pumps to deliver coolant to the surface of the grinding tool, but these are usually more complicated and thus more expensive than is warranted for many applications. Other methods of directing a spray of coolant are also used for grinding tools that use a radial rather than an axial or circumferential surface of the tool for grinding. However, it is often easier to deliver coolant to a radial face of a rotating tool than to an axial face as is required with the subject grinding apparatus.

SUMMARY OF THE INVENTION

In accordance with the Preferred Embodiment of the present invention, coolant is supplied to a rotating grinding tool by an impeller mounted on the same rotating shaft as the grinding tool. The motor that drives the grinding tool is housed below the coolant reservoir, and the motor shaft protrudes up through the coolant in the reservoir. The lower portion of the grinding tool is in the coolant in the reservoir, and an impeller is attached to this portion of the tool. Surrounding the impeller and the lower portion of the grinding tool is an annular collar that depends from the under side of the work table.

When the shaft rotates, the impeller drives coolant up toward the circumferential working surface of the grinding tool, and the annular collar helps contain the coolant driven by the impeller. At the top of the annular collar, the surface of the opening through the work table is bevelled to direct the coolant onto the working surface of the grinding tool.

The arrangement just described is able to supply a greater quantity of coolant to the surface of the tool than the prior art sponge, and it does not have the disadvantages of becoming clogged or worn out that the sponges have. Thus the present invention provides greater reliability and better cooling and washing of the working surface of the tool than the prior art. At the same time, the present invention is simpler and more economical than the prior art industrial systems that use separate pumps and associated pipes, etc. to deliver coolant to the tool surface.

DESCRIPTION OF THE PREFERRED EMBODIMENT

Figure 1:
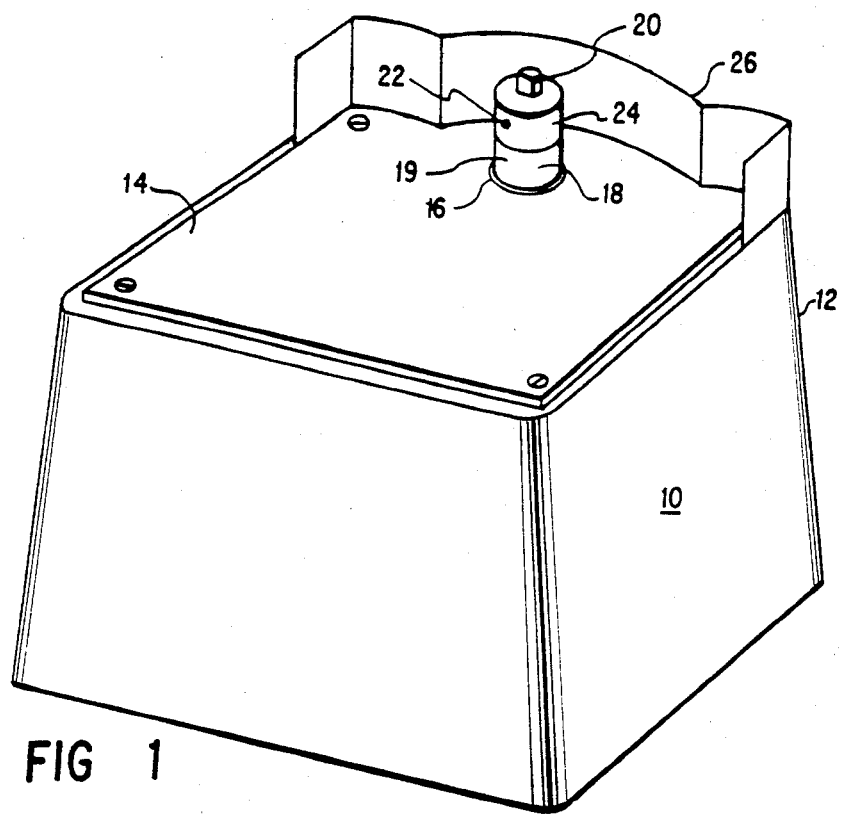
FIG. 1 shows a perspective view of a grinding apparatus in accordance with the preferred embodiment of the present invention.
Figure 2:
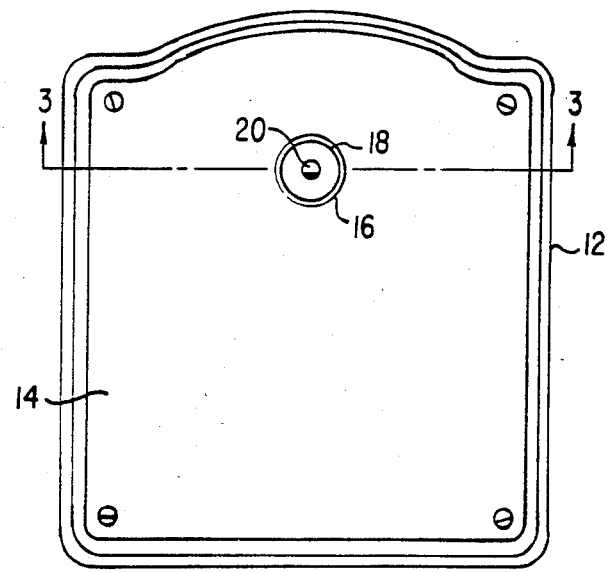
FIG. 2 is a top view of the apparatus of FIG. 1.

FIGS. 1 and 2 show a grinding apparatus 10 having a housing or base 12 that supports a work surface or table 14. Protruding through an opening 16 in the work table is a cylindrically shaped grinding tool 18. The grinding tool has an abrasive, circumferential working surface 19 and is attached to a drive shaft 20 by a set screw 22 in a metal end cap 24. To the rear of the grinding tool is an optional spatter shield 26. In order to shape a piece of glass to be used in a stained glass window or the like, an artisan lays the piece of glass on work table 14 and holds an edge of the piece of glass against rotating working surface 19 until the desired amount of material has been removed.

Figure 3:
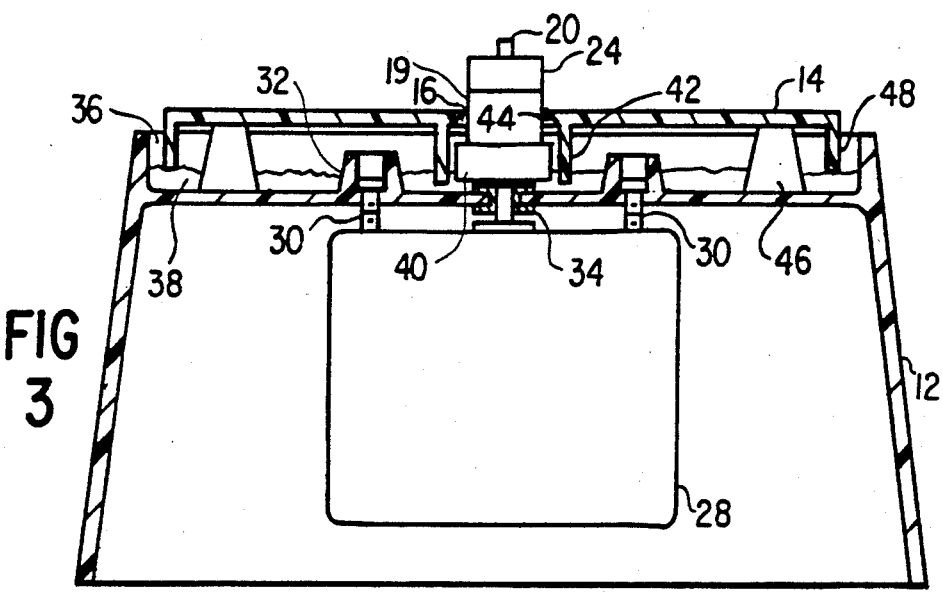
FIG. 3 is a cross sectional view of the apparatus of FIG. 1 along the section line shown in FIG. 2.

FIG. 3 shows a cross sectional view through grinding apparatus 10 along the section line indicated in FIG. 2. An electric motor 28 is suspended in base 12 by fasteners 30 secured in bosses 32. Shaft 20 passes through a seal 34 into a coolant reservoir 36 on top of base 12. A fluid coolant 38, such as water, is contained in reservoir 36.

Attached to the bottom portion of grinding tool 18 is an impeller 40 that is partially submerged in coolant 38 in reservoir 36. A collar 42 surrounds impeller 40 as well as a portion of working surface 19 of grinding tool 18. The collar is attached to the bottom of work table 14 or it may be advantageously formed out of the same piece of material as the work table, such as by molding. Opening 16 is at the top of collar 42, and the inner surface of opening 16 is bevelled toward the bottom to form a frusto-conical surface.

When motor 28 rotates grinding tool 18 and impeller 40, the impeller picks up coolant and impells it toward working surface 19 of the grinding tool. Collar 42 extends down into the coolant in reservoir 36 and confines the coolant picked up by the impeller. At the top of collar 42 the impelled coolant strikes frusto-conical surface 44, which directs the coolant toward working surface 19.

The action of the impeller coupled with the collar and the bevelled surface serves to bathe working surface 19 in coolant to cool and wash away particles of material that have been removed from the work piece. Spent coolant that collects on the top surface of work table 14 can return to reservoir 36 over the peripheral edges of the work table, and this return can be aided by drainage grooves in the work table (not shown).

Work table 14 is supported on base 12 by supports 46 in reservoir 36. An optional splash shield 48 depending from the peripheral edge of work table 14 can be used to prevent coolant from being splashed out of the reservoir due to the turbulence caused by the rotating impeller.

Figure 4A:
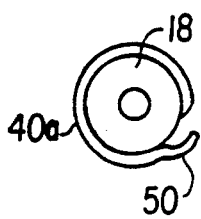
FIGS. 4a, 4b and 4c show one embodiment of an impeller for use in the apparatus of FIG. 1.
Figure 4B:
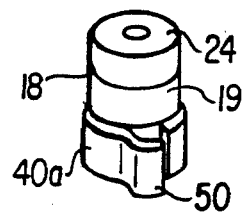
Figure 4C:
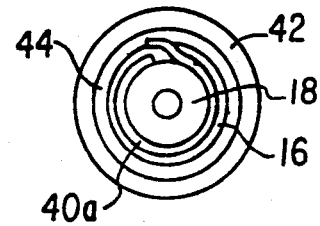

FIGS. 4a, 4b and 4c show one form of impeller 40a that has been found to work well in the preferred embodiment. Impeller 40a is a strip of sheet metal formed into an annulus with a scoop 50 on one end. FIG. 4a shows a top view of impeller 40a attached to the lower portion of grinding tool 18, and FIG. 4b shows a perspective view of this same assembly. In FIG. 4c a bottom view of the grinding tool and impeller assembly is shown in collar 42. As impeller 40a rotates (counterclockwise in FIG. 4a), scoop 50 picks up coolant from reservoir 36 and throws it up into collar 42 where it strikes bevelled surfaced 44 and is deflected to working surface 19.

Figure 5A:
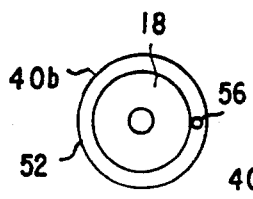
FIGS. 5a and 5b show an alternate embodiment of an impeller for use in the apparatus of FIG. 1.
Figure 5B:
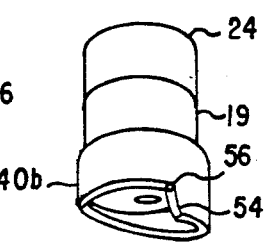

FIGS. 5a and 5b show an alternate form of impeller 40b that has also been found to work well in grinding apparatus 10. Here an annular piece of plastic 40b surrounds the lower portion of grinding tool 18. On the bottom portion of annular piece 52 there is a step-like protusion 54 and an opening to a passage 56. The passage extends to the top surface of annular piece 52, and as impeller 40b rotates (clockwise in FIG. 5a), coolant is forced through the passage by protrusion 54. The coolant flowing out of passage 56 is directed against working surface 19 by collar 42 and bevelled surface 44 as explained above.

Figure 6:
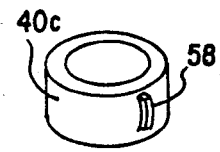
FIGS. 6 and 7 show additional alternate embodiments of an impeller for use in the apparatus of FIG. 1.
Figure 7:
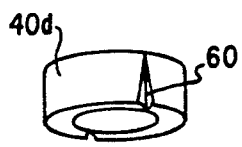

FIGS. 6 and 7 show other forms of impellers 40c and 40d that have been found to work satisfactorily. Impeller 40c is an annular member with one or more vanes 58 attached to the periphery thereof. Impeller 40d is also an annular member with one or more longitudinal grooves 60 or flutes cut in the outer surface thereof.

Figure 8:
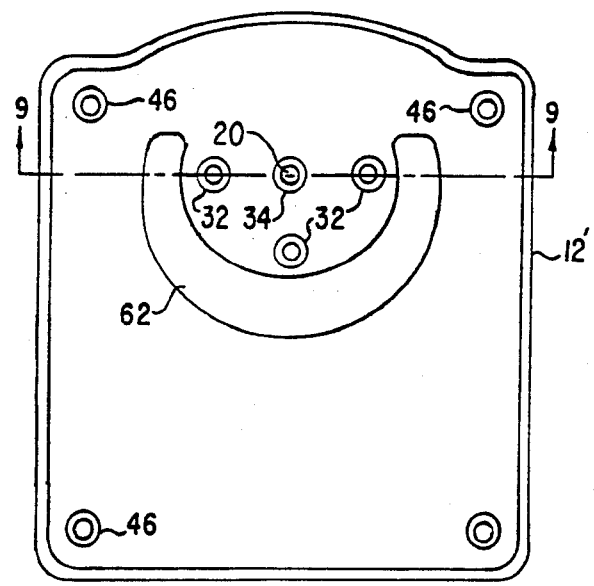
FIG. 8 shows an alternate embodiment of a housing for the apparatus of FIG. 1.
Figure 9:
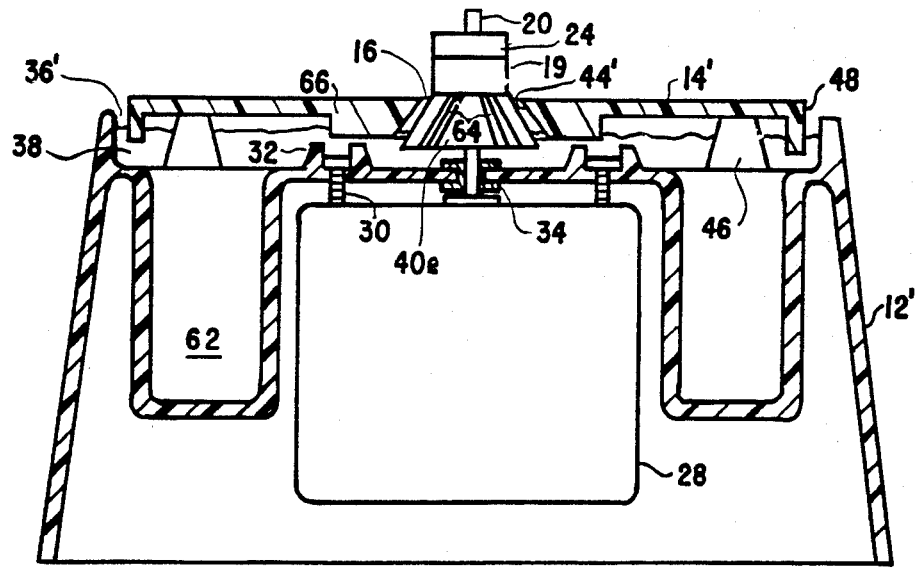
FIG. 9 is a cross sectional view of the apparatus of FIG. 8 showing additionally an alternate embodiment of an impeller and associated elements.

FIGS. 8 and 9 an alternate housing 12' as well as an alternate impeller 40e and collar 42' are shown. Housing 12' has a coolant reservoir 36' with a well 62 in a portion of it. The well gives the reservoir greater coolant capacity; and more importantly, it provides a place for the ground particles of glass, etc. to settle. This action helps to keep the coolant supplied to grinding tool 18 relatively clean. Impeller 40e is frusto-conical in shape and has grooves or flutes 64 in its surface. Work table 14' has a relatively thicker portion 66 near hole 16 to provide collar 42' having a frusto-conical surface 44' that extends from the top to the bottom surface of the table. The bottom surface of portion 66 extends down into coolant 38, and the counter of surface 44' is concentric with the outer surface of impeller 40e.

When impeller 40e is rotated by motor 28, coolant is picked up by grooves 64 and impelled upward. Collar 42' directs the impelled coolant toward working surface 19. In addition to grooves 64, other forms of impelling structures could be used on a conical impeller. For example, vanes similar to vanes 58 on impeller 40 could be used.

FIGS. 1, 3 and 9 show shaft 20 as essentially vertical so that the lower periphery of the impeller is submerged in the coolant in the reservoir. Shaft 20 can also be tilted somewhat from the vertical, 5 degrees for example, so that only a portion of the periphery of the impeller is submerged in the coolant and still impel coolant toward the tool when the shaft is rotating. For some configurations of impellers it may be advantageous to so tilt the shaft. In such a case, table 14 or 14' would preferrably also be tilted with respect to the horizontal to keep its top surface essentially orthogonal to shaft 20.

While the preferred embodiment of the invention has been described in terms of particular details, it will be appreciated by those skilled in the art that a number of modifications can be made to the embodiment described without departing from the spirit of the invention. For example, several different impellers that give satisfactory performance have been described, and although impellers 40a and 40b are preferred, other forms of impellers may also be used. Likewise, the specific grinding apparatus that has been described is used for planar pieces of glass, but the invention may also find application with other types of rotating tools that require cooling and lubication.

I claim:

1. A grinding apparatus comprising:
   a housing having a coolant reservoir for retaining a liquid coolant;
   drive means supported in the housing having a drive shaft that protrudes into the coolant reservoir;
   a grinding tool attached to the drive shaft;
   a work table supported on the housing above the coolant reservoir, the work table having an opening through which the grinding tool protrudes;
   an impeller attached to the drive shaft, at least a portion of the impeller being situated in the coolant reservoir for impelling coolant upwards from the reservoir when the drive shaft is rotating; and
   collar means extending downwardly from the work table into the coolant in the coolant reservoir and surrounding at least a portion of the impeller and the portion of the grinding tool that extends below the work table, thereby serving to direct the coolant from the impeller towards the grinding tool.

2. A grinding apparatus as in claim 1 wherein:
   the collar means is an annular member attached to the underside of the work table; and
   the opening in the work table is bevelled to direct the coolant on to the grinding tool.

3. A grinding apparatus as in claim 2 wherein the annular member is formed integrally with the table.

4. A grinding apparatus as in claim 2 wherein the impeller is attached to the grinding tool.

5. A grinding apparatus as in claim 3 wherein the impeller has a scoop-like projection for impelling the coolant towards the grinding tool.

6. A grinding apparatus as in claim 3 wherein the impeller has an outer surface that has a flute for impelling the coolant towards the grinding tool.

7. A grinding apparatus as in claim 3 wherein the impeller is in the form of an annular collar around a lower portion of the grinding tool, and the annular collar has a passageway extending from one end of the collar to the other end through the collar and a step-like projection on the lower end of the collar for directing the coolant up into the passageway.

8. A grinding apparatus as in claim 1 wherein the collar means comprises a portion of the work table that extends into the coolant and has a bevelled surface surrounding the impeller.

9. A grinding apparatus as in claim 8 wherein the impeller has a frusto-conical surface with a flute formed therein.

10. A grinding apparatus as in claim 8 wherein the impeller has a frusto-conical surface with a vane thereon.

11. A grinding apparatus as in claim 3 wherein the drive means is an electric motor mounted in the housing below the coolant reservoir.

12. A grinding apparatus as in claim 11 wherein the work table has a peripheral, downwardly extending splash shield.

13. A coolant applicator for a rotatable tool, having a circumferential working surface, mounted on a rotatable shaft comprising:

reservoir means for containing a fluid coolant;

impeller means mounted on the shaft immediately adjacent the tool and at least partially submerged in the coolant in the reservoir for impelling coolant from the reservoir means toward the tool; and confining means having a cylindrical inner surface portion surrounding a portion of the impeller means and the tool and a frusto-conical surface portion surrounding a portion of the tool immediately adjacent the working surface of the tool for directing coolant impelled by the impeller means from the reservoir means towards the working surface of the tool.

14. A coolant applicator as in claim 13 wherein the confining means is in the shape of a collar that extends down into the reservoir means.

15. A coolant applicator as in claim 14 wherein the impeller means comprises an annular member surrounding a portion of the tool and having a radial protrusion therefrom.

16. A coolant applicator as in claim 14 wherein the impeller means comprises an annular member surrounding a portion of the tool and having a longitudinal passage therethrough.

17. A coolant applicator as in claim 14 wherein the impeller means is a cylindrical member having an outer surface with a flute therein.

18. A coolant applicator as in claim 14 wherein the impeller means is a cylindrical member having an outer surface with a vane thereon.

19. A coolant applicator for a rotatable tool, having a circumferential working surface, mounted on a rotatable shaft comprising:

reservoir means for containing a fluid coolant;

impeller means, having a frusto-conical outer surface, mounted on the shaft immediately adjacent the tool and at least partially submerged in the coolant in the reservoir for impelling coolant from the reservoir means toward the tool; and confining means, having a frusto-conical inner surface, surrounding a portion of the tool and at least a portion of the impeller means for directing coolant impelled by the impeller means from the reservoir means towards the working surface of the tool.

20. A coolant applicator as in claim 19 wherein the frusto-conical outer surface of the impeller means has at least one flute therein.

21. A coolant applicator as in claim 19 wherein the frusto-conical outer surface of the impeller means has at least one vane thereon.

* * * * *